United States Patent [19]

Pryor

[11] 4,137,868

[45] Feb. 6, 1979

[54] METHOD AND APPARATUS FOR GROWING SEAFOOD IN COMMERCIALLY SIGNIFICANT QUANTITIES ON LAND

[76] Inventor: Taylor A. Pryor, 41-477 Kalanianole Hwy., Waimanalo, Hi.

[21] Appl. No.: 727,944

[22] Filed: Sep. 29, 1976

[51] Int. Cl.$^2$ ............................................. A01K 61/00
[52] U.S. Cl. ......................................... 119/2; 119/3; 47/1.4
[58] Field of Search ........................ 119/2, 3, 4; 47/1.4

[56] References Cited

U.S. PATENT DOCUMENTS

| | | | |
|---|---|---|---|
| 3,116,712 | 1/1964 | Ogden et al. | 119/2 X |
| 3,473,509 | 10/1969 | Miyamura | 119/2 |
| 3,763,824 | 10/1973 | Schoon | 119/4 |
| 3,858,554 | 1/1975 | Beaupoil et al. | 119/2 |
| 3,889,639 | 6/1975 | Day et al. | 119/2 |

Primary Examiner—Hugh R. Chamblee
Attorney, Agent, or Firm—Warren M. Becker

[57] ABSTRACT

A method and apparatus for growing seafood in commercially significant quantities on land, comprising a means for and the steps of transporting water from a source of water to a plurality of algal reservoirs, each having a volume equal to or exceeding 2½ feet × ⅛ acre; inoculating the reservoirs with phytoplankton from a source of phytoplankton having a minimum density of $10^1$ to $10^3$ organisms/liter; adding fertilizer to the water in the reservoir daily for providing a mixture and subjecting the mixture to sunlight for increasing the density of the phytoplankton in the water to a density exceeding $10^5$ organisms/liter; transporting a predetermined percentage of the water and phytoplankton continuously, once the reservoirs are in bloom, from the algal reservoirs through trenches containing seafood for which the phytoplankton is a nutrient for growing the seafood; and continuously transporting the water, including the effluent and wastes deposited by the seafood in the trenches, from the trenches to a purging pond containing seaweed for which the wastes and effluent are a nutrient for growing the seaweed and purging the water of the seafood wastes and residual phytoplankton.

12 Claims, 13 Drawing Figures

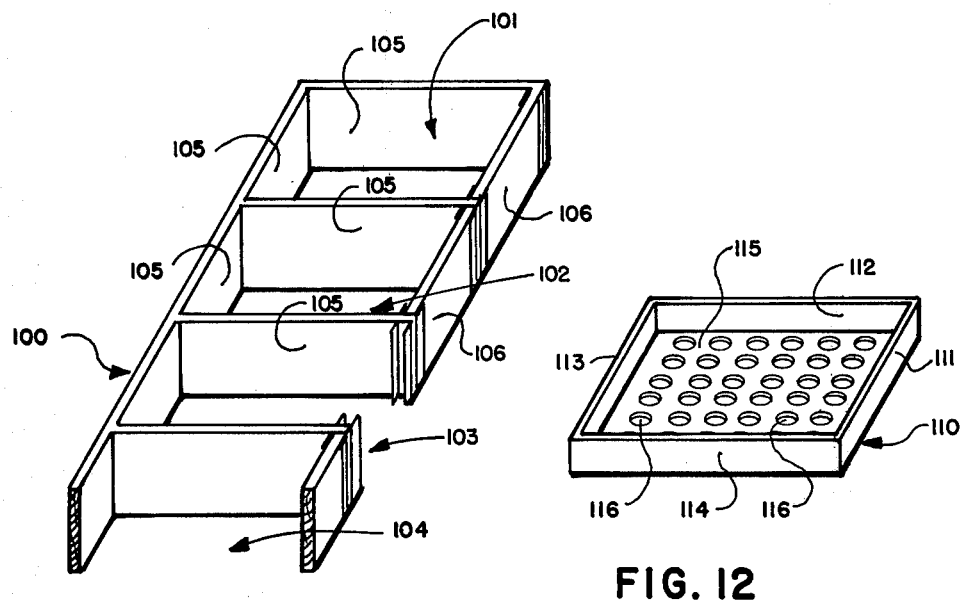
FIG. 11
FIG. 12
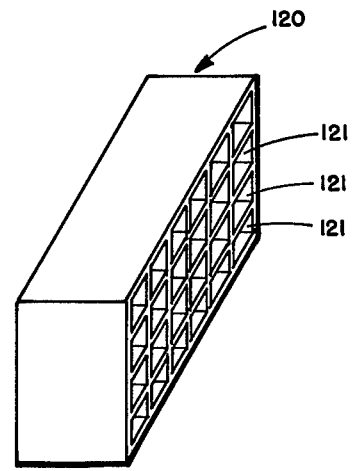
FIG. 13

METHOD AND APPARATUS FOR GROWING SEAFOOD IN COMMERCIALLY SIGNIFICANT QUANTITIES ON LAND

BACKGROUND OF THE INVENTION

The present invention relates to the growing of foodstuffs in general and in particular to a method and apparatus for growing progressively higher trophic levels of marine life in a closed and ecologically balanced system.

Systemculture is a term coined to describe in a single word the essence of the present invention. It comprises multiple trophic levels and is a system of aquaculture which, unlike its predecessors, requires a continuous management of the interrelationship between the several trophic levels in the system.

While the trophic levels in a typical ecologically balanced food chain are many in number, they may be considered broadly in two categories. The two categories are plant life and plant-eating animals. Of principal interest presently is the growing of phytoplankton for food for oysters and clams and the collection of their effluent from the feeding for the growing of seaweed, which is harvested for providing a fertilizer or used as a food for omnivore — e.g., lobster, shrimp, turtle, fish such as mahimahi, etc.

Heretofore, there have been, and indeed there are presently, two forms of well known aquacultures: a monoculture and a polyculture.

An example of a monoculture is the growing of seaweed and turtles in separate reservoirs. An example of a polyculture is the growing of turtles and seaweed together in the same reservoir. In the monoculture, the seaweed and turtles are fed nutrients and harvested for a market. This is analogous to the maintaining of cattle in a system feed lot wherein the cattle are maintained in an enclosure and feed, enriched with certain supplements, is transported to the cattle and fed to them in controlled amounts. In the polyculture, the turtles feed on the seaweed and in turn discharge wastes into the pond, which feeds the seaweed. Both the turtles and the seaweed are harvested as their respective volumes and numbers exceed the capacity of their enclosures.

In the monoculture there is a degree of management in that control is exercised over the amount of nutrients fed to the product to be marketed. There is, however, typically no attempt made to use the wastes and effluent of one to feed or otherwise produce the other.

In contrast, in a polyculture, the wastes and effluent of one trophic level are used to feed or otherwise produce the trophic level on which it feeds and, in a more sophisticated system, to feed or otherwise produce a higher trophic level. There is, however, no attempt made to control the amount of nutrients supplied by the one to the other, nor is there any control exercised over the manner in which the nutrients are supplied. The system is typically wholly contained and self-regulating.

While it is clear that a natural food chain is effective, it is equally clear to the point of being axiomatic that nature is not always the most efficient.

A principal object of the invention is, therefore, a system of growing seafood which is highly efficient.

The present invention, while applicable to the growing of multiple species of marine life, will be described principally with respect to the growing of shellfish, such as oysters, clams and lobsters, and the production of their nutrients.

Oysters, for example, feed most productively on certain species of phytoplankton. Phytoplankton is a small, microscopic, floating plant. It can't swim on its own. It is, in its natural state, when healthy, suspended in the sea. It grows, or possibly more correctly stated, multiplies by dividing. Its rate of growth or multiplication in nature is such that it reproduces about every 16 hours, depending on its species, the level of its nutrients and the temperature of its environment. The species of principal interest are *Nitzchia sp., Thalassiosira pseudonana Skeletonema costatum, Phaeodactylum tricornutum,* and *Tetraselmis sp. Chaetoceras sp. Cryptomonas sp., Isochrysis sp.* and *Monochrysis sp.* are good feed for larvae. The nutrients on which they depend in nature include nitrates, phosphates, silicates and trace elements. Dissolved oxygen, pH and ammonia levels must also be controlled and the temperature range within which they have their maximum growth rate is 24–26° C. Temperatures within this range are typically found in the tropics. It is well known, however, that, while having an abundance of sunshine, the tropics are deficient in the nutrients necessary for oyster growth. They are deficient in nutrients because the nutrients are consumed rapidly and are not replenished quickly enough due to the high growth rates which prevail in the tropics, thus leaving to the colder climates the majority of the present oyster production, albeit at much slower growth rates.

At the present time, in the commercial shellfish industry, oysters are removed from the bottom of an oyster bed by dredging or tonging. Dredging is accomplished by scooping the oysters from the bottom of the oyster bed with mechanical shovels or by means of a vacuum. Tonging involves the use of long tongs which are manually manipulated by a person standing in a flat-bottom boat for grasping the oyster and raising them from the bottom of the oyster bed.

To prepare an oyster bed for the growing of oysters, oyster shells from a prior catch, or other clean surfaces, are laid on the oyster bed. When the seeds of the females have been fertilized by the sperm, the resulting larvae (spat), after a short period of random swimming about, attach (settle) themselves to the shells or other clean surfaces, undergo a metamorphosis and begin maturing as an oyster. Often a number of "spat" will "settle" on a single oyster shell. It will be understood that, if a number of oyster larvae attach themselves to the same clean surface, oyster clusters will form. The formation of oyster clusters makes it difficult during harvest to shuck the oysters and to sort them according to size. It is also hard to clean the mud and slit from the bottom of the oyster bed from the oysters if they are clustered.

Another method of growing oysters is called racking. In racking, oyster shells from a prior shucking are pierced and strung on strings. The strings are suspended from rods or the like forming racks in the ocean. Oyster spat is allowed to settle on the oyster shells attached to the strings. "Racking" of oysters shortens the growing period to market size of the oyster from approximately 3 years to 18 months, eliminates — or at least reduces — cleaning and avoids the time-consuming and costly inefficiencies of dredging and tonging. In racking, however, there are certain disadvantages which exist and which are commo to all present ocean-based commercial seafood growing operations. These are destructive weather, predation (sharks, etc.) pollution, problems of legal ownership, government regulations, the high cost of operation and, very importantly, lack of food control in terms of amunt, type and location relative to the location of the growing animals.

Land-based aquaculture eliminates many of the above mentioned problems and disadvantages inherent in traditional methods of fish farming. Moreover, the potential tonnage per hectare of a well organized land-based aquaculture is so high that great areas of ocean really aren't needed. Why aquatic efficiency is so great is not clearly understood. However, there are some reasons which may be accepted. First, production gets a boost from the aquatic relief of gravity and friction. To use an analogy, if a poultry farmer wants to cycle manure out to a field, grow grain there and bring the feed back, he must use shovels, wagons, spreaders, harvesters, storage bins and conveyor belts. The oyster farmer, using the method and apparatus of the present invention, only needs to lift a weir board and let the flow of water do the rest. A particle of effluent from an oyster at a site can be carried a mile down therunway to fertilize a cell of phytoplankton which, in turn, can be carried a mile back to be absorbed by another oyster.

Another factor in the aquatic efficiency is the structure and physiology of marine plants and animals. For example, seaweed can double its weight every 60 hours because all of its energy is going to growth and not to the stalk and stem that are needed for so much of the bulk of terrestrial plants.

Because of these factors, the clear need for an expanded world food production, and the ever increasing limitations on land production due to an ever decreasing availability of petroleum-based fertilizers and fuel-demanding irrigation, a number of individuals and companies have been conducting research on various forms of acquaculture and mariculture. Most of this research, however, has been based on relatively small-scale experiments under laboratory conditions. While there have been proposals, few entirely integrated large-scale, wholly land-based, commercially significant aquaculture systems have been attempted. For example, in U.S. Pat. No. 3,735,736 there is proposed a method and apparatus, using a system of trenches and the warm water effluent from a nuclear plant for growing shrimp. It is mentioned that the shrimp are fed periodically, but there is no discussion of how the food is produced, no disclosure of a method or means for producing the food continuously and no method or means disclosed for controlling the type of food, the amount of food delivered for feeding to a particular animal or small group of animals and the time of feeding.

To produce seafood in commercially significant quantities, it is considered essential that the nutrients for feeding the seafood be produced on a large scale in a controlled manner, and continuously. For example, to feed oysters, clams and the like, this means that large-scale algal ponds or reservoirs are required in which phytoplankton can be maintained in a state of "bloom" uninterruptedly for long periods of time, such as 30 to 60 days, and while a high percentage of its volume (such as one-half to two-thirds) is "harvested" continuously.

Heretofore, the largest man-made algal pond believed to have been attempted to be maintained for growing phytoplankton to feed seafood was about 12,000 gallons, or less than ⅛ acre in area and about 3 feet deep. So far as is known, however, there has been no report that the attempt was successful. If, indeed, the attempt was not successful, it would not be surprising, because large bodies of water are different from small bodies as a growing medium and heretofore were vastly more difficult to manage, especially when the management involved the maintenance of a large-scale continuous flow algal pond having a high density of phytoplankton, such as a density exceeding $10^5$ organisms/liter.

SUMMARY OF THE INVENTION

In view of the foregoing, principal objects of the present invention are a method and apparatus for growing seafood efficiently in commercial quantities in a wholly land-based, ecologically balanced aquaculture system.

Generally, five kinds of facilities are provided to farm in this fashion. First, there are provided a source of brackish or salt water and an inexpensive method of pumping the water. Second, there is provided a plurality of reservoirs for growing microscopic marine plants. Third, there is provided a plurality of production trenches. Each of the production trenches is adapted for removably receiving inserts chosen especially for the crop selected for that particular trench. For example, clams and oysters require stacks of trays having closed side walls orientated so that plankton-rich water passes vertically through them in the manner of a filter bed. Turtles, on the other hand, are provided partitions which are placed at intervals in the trenches confining groups of turtles into small aquatic feed lots. Lobsters and octopuses are provided long facing rows of honeycomb units forming numerous caves giving each animal a place to hide and to feed the passing current. Fourth, there is provided a means for transporting the water between the reservoirs and a trench and, as it leaves the trench, to a purging pond containing seaweed, for which the waste in the trench effluent is a nutrient. Finally, there is provided conventional farm equipment, such as flat-bed trucks and hoists, which are required for harvesting the crops from the trenches.

The advantages of a land-based aquaculture system, as described, are manifold. Among the advantages is freedom from pollution and disease, such as has totally destroyed entire oyster crops in various parts of the world in recent years. Similarly, there is no problem with predators such as sharks, strong currents or destructive weather nor are there any questions of legal ownership or government regulations as are now used for regulating seafood catches at sea. Moreover, growth weight and size can be controlled by controlling the amount and type of food and the temperature of the water used. Also, various species of seafood can be grown simultaneously or in successive growing periods depending on market needs.

More specifically, in a present embodiment of the invention, there is provided a source of phytoplankton. The source is a relatively shallow, uncovered well, as of five feet deep, located adjacent to an ocean, which collects water and phytoplankton. The phytoplankton density in the well is typically between $10^1$ to $10^3$ organisms/liter. Near the phytoplankton well there is provided a plurality of inoculating pools. Each of the pools has a capacity of about 4000 gallons and is coupled to a source of brackish or salt water. The source of brackish or salt water is a deep well as of 60 feet deep or the ocean. To fill the inoculation pools, 3500 gallons of water from the deep well are pumped in each of the inoculating pools and the water thus placed is inoculated with 500 gallons of phytoplankton-laden water from the shallow well. Thereafter the water in the pools is mixed with fertilizer daily until the phytoplankton density level reaches $10^7$ to $10^8$ organisms/liter. Near the inoculating pools there is provided a reservoir having a 2½ foot × ¼ acre capacity and a plurality of larger volume reservoirs having 2½ feet acre capacities. After the density of the phytoplankton reaches $10^7$ to $10^8$ organisms/liter in each of the inoculating pools, 2½ pools are emptied into the 2½ foot ¼ acre reservoir for inoculating the 2½ foot ¼ acre.

Thereafter the 2½ foot ¼ acre reservoir is fertilized daily until the phytoplankton density reaches a level of $10^7$ to $10^8$ organisms/liter. When the 2½ foot ¼ acre reservoir reaches a phytoplankton level of $10^7$ to $10^8$ organisms/liter, approximately one fourth of its volume is used to inoculate each of the 2½ foot acre reservoirs. Thereafter, each of the 2½ foot acre reservoirs is fertilized daily until is phytoplankton density level reaches a level of from $10^7$ to $10^8$ organisms/liter.

Once a reservoir is in "bloom" — i.e., has reached a desired phytoplankton density level as of from $10^7$ to $10^8$ organisms/liter — the phytoplankton is removed at a rate of from one half to two thirds of the volume of the reservoir and transported through the production trenches for feeding seafood contained in trays or other inserts contained therein. From the trenches, the efflunt including the wastes are transported to a purging pond containing seaweed. The wastes are nutrients for the seaweed and the seaweed feeds on the wastes and purges the water.

In the purging pond there is provided a deep discharge well, as of 60 feet deep. The well is located in a position which prevents uncontrolled contamination of the brackish and salt water source and phytoplankton source. In this fashion, the water discharged through the well may be returned to the system after natural filtration in the earth.

BRIEF DESCRIPTION OF THE DRAWINGS

The above and other objects, features and advantages of the present invention will become apparent from the following detailed description of accompanying drawings in which:

FIG. 11 is a perspective view of a pallet according to the present invention for supporting inserts in the trenches of FIGS. 6, 7, 8, 9 and 10.

FIG. 12 is a perspective view of a tray insert according to the present invention.

FIG. 13 is a perspective view of a honeycomb enclosure insert according to the present invention.

DETAILED DESCRIPTION OF THE INVENTION

Figure 1:
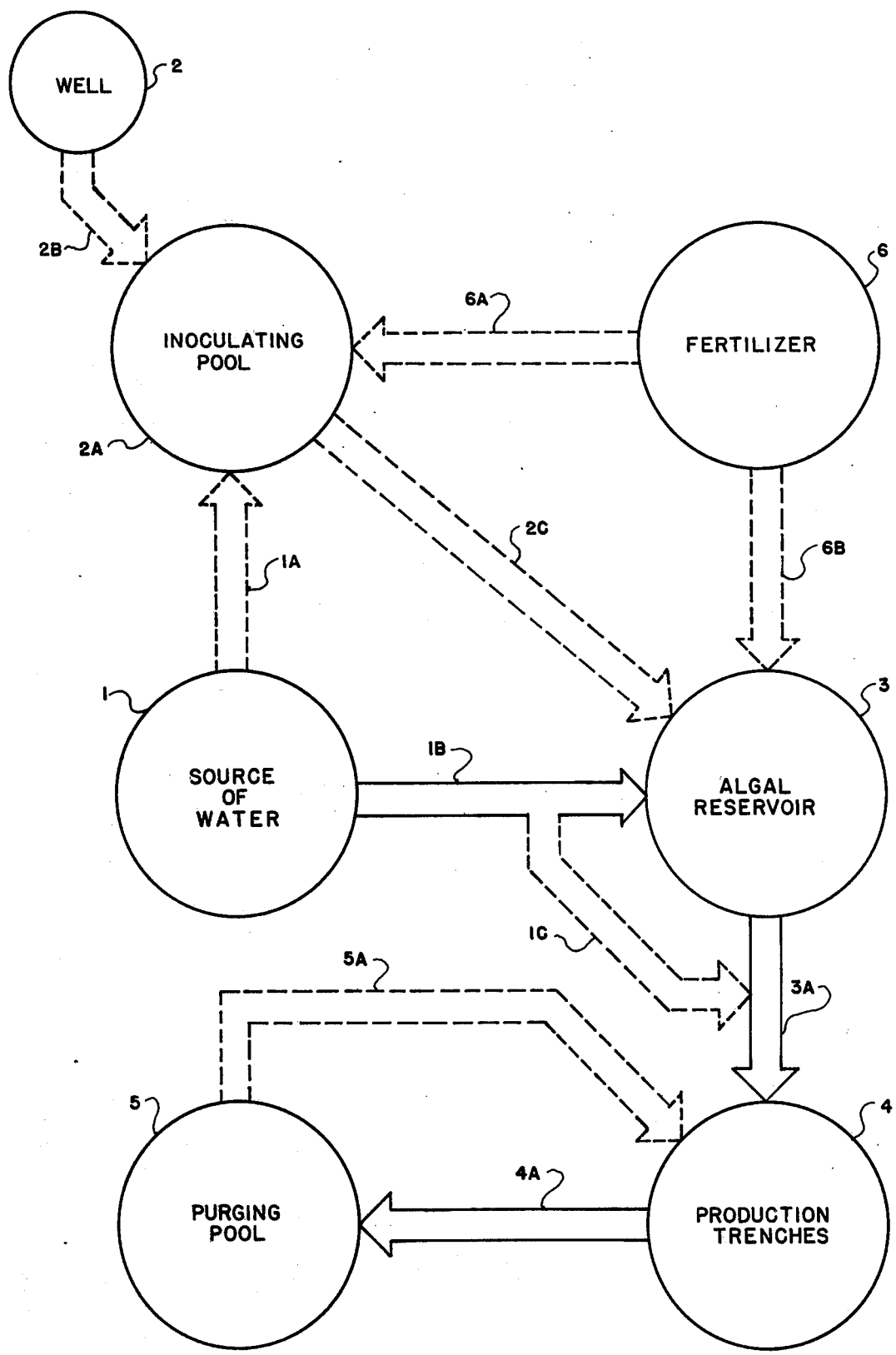
FIG. 1 is a flow diagram of a land-based aquaculture system according to the present invention.

Referring to FIG. 1, there is provided in a system in accordance with the present invention a source of salt or brackish water 1 and a source of phytoplankton 2. The source 1 is a deep well as of 60 feet deep or the like. The source 2 is a relatively shallow uncovered well as of five feet deep and adjacent to a natural source of phytoplankton such as an ocean. The source 2 preferably has a natural density of phytoplankton therein of at least $10^1$ to $10^3$ organisms/liter. Near the sources 1 and 2 there is provided a plurality of 4000-gallon inoculation pools 2A, a plurality of algal reservoirs 3, each having a capacity of from ¼ to one acre and 2½ feet deep, one or more production trenches 4, a plurality of purging ponds 5 and a source of fertilizer 6. Pumps, such as Archimedes screws or the like (not shown), are used for pumping water from one location to another in the system.

Before production in the trenches begins, the density of the phytoplankton in the reservoirs 3 is caused to equal or exceed $10^5$ organisms/liter and is preferably between $10^7$ and $10^8$ organisms/liter. To achieve these high density levels, the inoculating pools 2A are each filled with 3500 gallons of water from the source 1, as shown by the dashed arrow 1A and 500 gallons of water from the source 2 as shown by the dashed arrow 2B. The pools 2A are thereafter fertilized daily from the source 6, as shown by the dashed arrow 6A until each one of them achieves a phytoplankton density level of about $10^7$ to $10^8$ organisms/liter.

When the pools 2A have achieved the desired density level, the 2½ foot ¼ acre algal reservoir is filled from the source 1, as shown by the solid arrow 1B and inoculated with the water from two and a half of the pools 2A. Thereafter, the 2½ foot ¼ acre reservoir is fertilized daily from the source 6, as shown by the dashed arrow 6B until it achieves a density level of $10^7$ to $10^8$ organisms/liter. When the 2½ foot ¼ acre reservoir reaches the desired density levels, each of the 2½ foot acre reservoirs are filled from the source 1 and inoculated with water from about one-fourth of the 2½ foot ¼ acre reservoir. After the inoculation, the 2½ foot acre reservoirs are fertilized daily until they reach a density level of between $10^7$ to $10^8$ organisms/liter.

As will be described further, once the reservoirs 3 have obtained the desired density levels, production begins with the continuous transportation of water from the source 1, into the reservoirs 3 and from the reservoirs 3 through the trenches 4 as shown by the solid arrows 1B and 3A. The water is being transported at a controlled rate of from one-half to two thirds of the volume of each of the reservoirs 3 daily. It may be well to note that once in bloom, all of the reservoirs, including the smaller 2½ foot ¼ acre reservoir is used in production. The amount of water which is transported through a particular trench is also controlled and depends on the amount of seafood being grown therein, its size and feeding capacity.

From the trenches 4, the effluent is transported, as shown by the solid arrow 4A, to a purging pond 5 containing seaweed and having a deep discharge well (not shown). The seaweed, as will be further described, feeds on the wastes in the effluent from the trenches 4 and purges the water. The deep discharge well serves to discharge the purged water into the earth at a location which precludes an undesired contamination of the sources 1 and 2. Alternatively, a portion of the discharge from purging pool 5 may be controllably recirculated through the trenches 4, as shown by the dashed arrow 5A for maximizing the use of the nutrients in the water.

The arrows used to illustrate the present invention in FIG. 1 are dashed and solid to represent differing levels of activity. The dashed arrows represent activities which occur periodically or only on occasion. The solid arrows represent activities which are continuous. It is to be understood, however, that if an algal reservoir "crashes" it is necessary to interrupt the continuous operation until the reservoir is again in bloom by the method described above.

Figure 2:
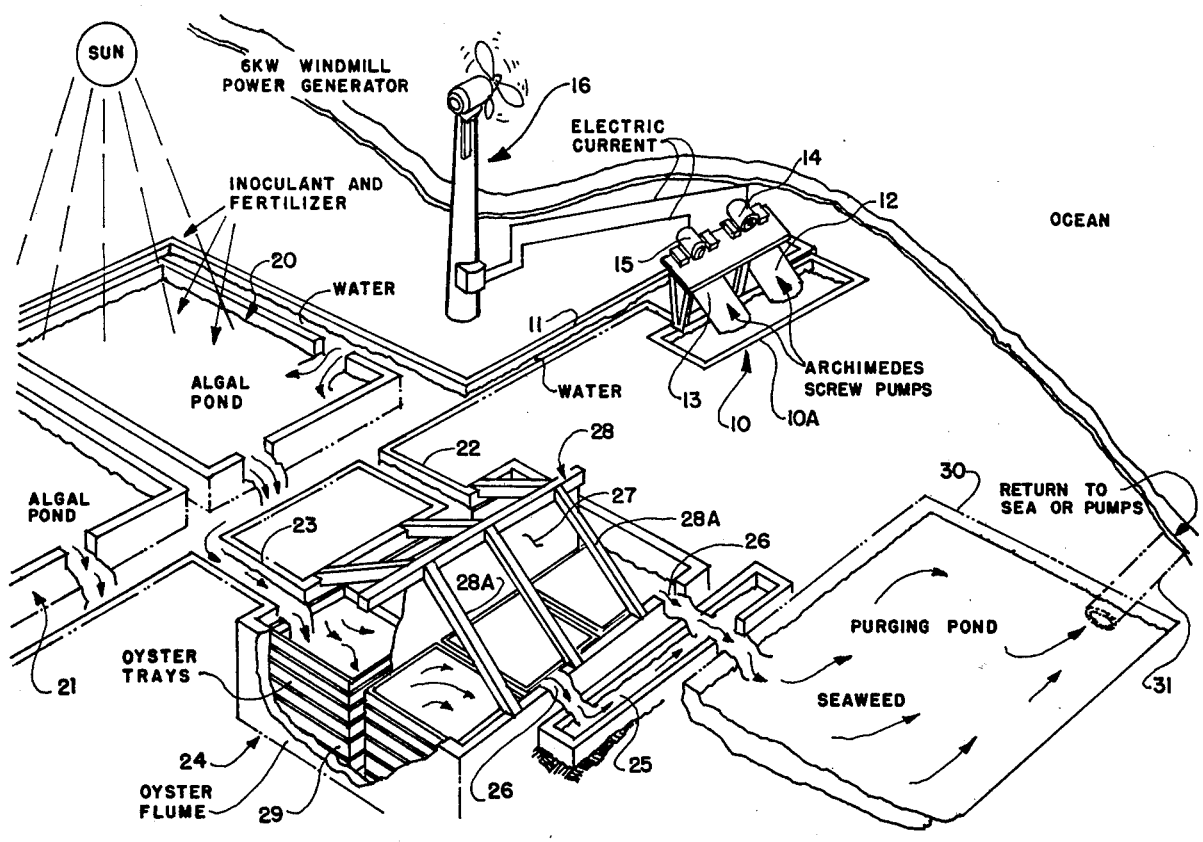
FIG. 2 is a three-dimensional diagram of a land-based aquaculture system according to the present invention.

Referring to FIG. 2, there is shown in a perspective diagram an illustration of the continuous flow portions of a typical land-based aquacultural complex according to the present invention, comprising a source of water 10 which corresponds to the source 1 of FIG. 1. The inoculating well 2 and pools 2A and source of fertilizer 6 of FIG. 1 are indicated only generally. As in the illustration, the source 10 is a deep well 10A which may or may not be covered, depending on the prevailing conditions. Depending on the height of the water, the water from the source 10 is pumped into flume 11 by means of one or mre Archimedes screw pumps 12 or 13 or the like. Each of the pumps 12 and 13 is driven by means of a five-horsepower motor 14 and 15. Electricity for driving the motor 14 and 15 is generated by means of 6KW windmill powered generator assembly 16.

Water from the source 10, which is pumped into the flume 11, flows through the flume 11 to a pair of algal reservoirs 20 and 21. In an actual embodiment, the reservoirs 20 and 21 each typically comprises from one-quarter acre to one acre in area and is approximately 2½ feet deep for containing about 815K gallons of water per acre. The bottom of the reservoir comprises asphalt and coral rock. The side walls comprise unlined concrete members.

In fluid communication with the reservoirs 20 and 21, by means of a pair of flumes 22 and 23, is a trench 24. Trench 24 is typically rectangularly shaped and approximately 3½ feet deep and has, extending along its lateral edge opposite the flumes 22 and 23, a gutter 25. Gutter 25 serves as a trench effluent gutter and is provided for receiving effluent from the trench 24 through a pair of weirs or pukas 26. Suspended in the center of the trench 24 and extending in a plane parallel to the major axis thereof, there is provided a septum 27. Septum 27 comprises a rubber sheet or the like and is suspended in the plane in a vertical orientation by means of a truss framework 28. Framework 28 typically comprises a plurality of inclined rafters 28A abutting at their upper ends a horizontally extending board from which the septum hangs. For reasons which will be described below, framework 28 serves to suspend the septum 27 such that its bottom is held a predetermined distance, as of 5 inches, above the bottom of the trench 24. On either side of the septum 27 space is provided in the trench 24 for receiving and containing a plurality of inserts 29. The inserts 29, as shown in FIG. 2, are screened trays, having closed sides and an apertured bottom, for containing oysters. The trays 29 will be further described below, as will other types of inserts for containing other types of seafood.

In fluid communication with the discharge gutter 25 there is provided a purging pond 30. Pond 30 is provided for receiving water from the gutter 25. At the output end of the purging pond 30 there is provided a discharge pipe or the like 31. Pipe 31 is provided for discharging effluent from the purging pond and for returning the purged effluent to the water source 10, either directly or via a natural filtration process through the earth. As will be apparent, only a partial direct return of purged effluent should be employed to prevent or reduce loss due to non-purged contaminants.

Figure 3:
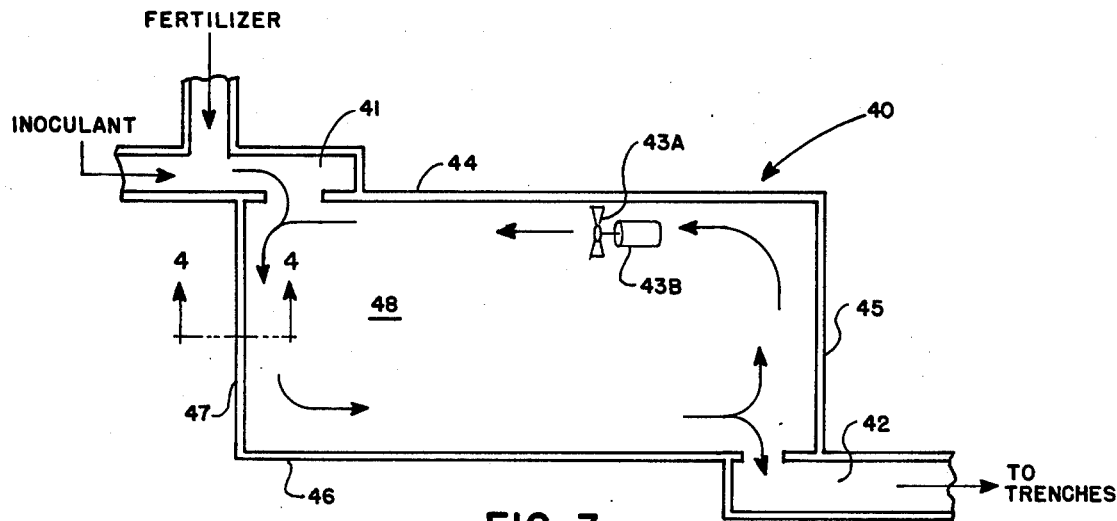
FIG. 3 is a plan view of a secondary algal reservoir according to the present invention.

Referring to FIG. 3, there is provided an algal reservoir 40. Reservoir 40 has a plurality of side wall members 44, 45, 46 and 47 of unlined concrete and a bottom 48 of asphalt and coral rock, and corresponds to one of the algal reservoirs 20 and 21 of FIG. 2. At one end of reservoir 40 there is provided a fluid inlet 41. Inlet 41 is provided for coupling the reservoir 40 to a source of phytoplankton and fertilizer. At the opposite end of the reservoir 40 there is provided a fluid outlet 42. Fluid outlet 42 is provided for coupling the reservoir 40 to a seafood production trench, such as the trench 24 of FIG. 2 or a trench, as will be described below. At one or more suitable locations within the interior of the reservoir 40 there is provided a circulation impeller apparatus 43. Apparatus 43, for example, may comprise a 3-foot impeller 43 A, which is driven at a low rpm by a low-horsepower electric motor 43B, as of 5 hp. The apparatus 43 serves to circulate the water in the reservoir 40. A typical reservoir 40 is from o/4 to one acre in area and 2½ feet deep for containing about 815,000 gallons per acre. As will be apparent, the reservoir 40 may be either a primary or a secondary reservoir and, in some applications, could be adapted to serve as a source of phytoplankton.

Figure 4:
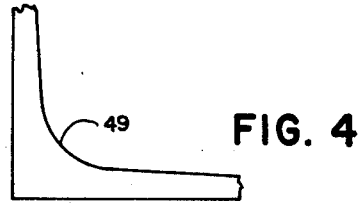
FIG. 4 is a cross-sectional view taken along lines 4—4 of FIG. 3.

Referring to FIG. 4, the juncture of the side-wall members 44, 45, 46 and 47 with the bottom 48 of the reservoir 40 is provided to have a curved surface 49. Curved surface 49 is provided for reducing the opportunity for dead space in the reservoir 40 and to facilitate the circulation of water therein in the direction of the arrows.

Figure 5:
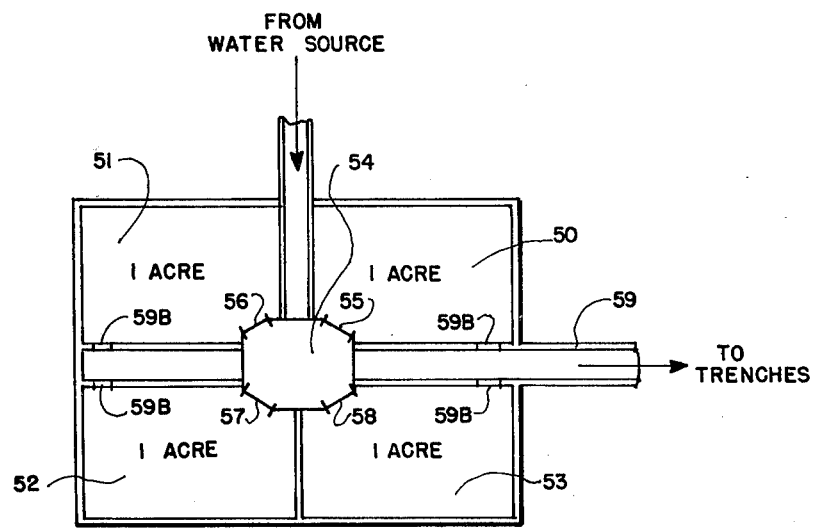
FIG. 5 is a plan view of four algal reservoirs according to the present invention.

Referring to FIG. 5, there is provided a plurality of algal reservoirs 50, 51, 52 and 53. Like the reservoir 40 of FIG. 3, each of the reservoirs 50–53 comprises concrete side-wall and asphalt and coral rock bottom members. In the center of the reservoirs 50–53 there is provided a weir box 54. Weir box 54 is provided with four outlets 55, 56, 57 and 58. Each of the outlets 55–58 is located to be in fluid communication with an associated one of the reservoirs 50, 51, 52 and 53, respectively. Passing through the center of the reservoirs 50–53, between the reservoirs 50 and 51, and reservoirs 52 and 53, respectively, there is provided a flume 59 and between the reservoirs 50 and 51 a flume 59A. The weir box 54 is provided for receiving water from the flume 59A, which is connected to a source of water such as the source 10 of FIG. 2, for distributing it into the reservoirs 50–53 through an associated one of the weir box outlets 55–58. The flume 59 is provided for transporting water from the reservoirs 50–53 to a production trench and, accordingly, each of the reservoirs is coupled to the flume 59 by an associated weir 59B. In practice, each of the reservoirs 50–53 is also provided with a circulation apparatus as described with respect to apparatus 43 of FIG. 3 and a specially adapted bottom-side wall contour as described with respect to the surface 49 of FIG. 4.

Figure 6:
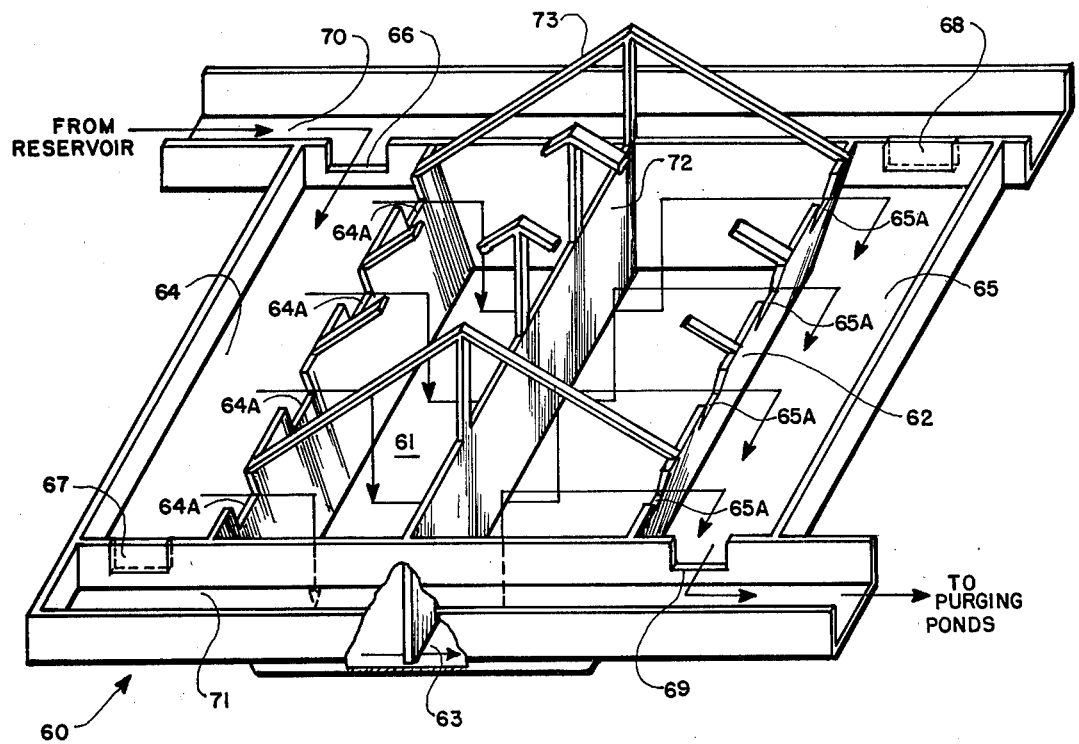
FIG. 6 is a perspective view of a production trench according to the present invention, with or without inserts.
Figure 7:
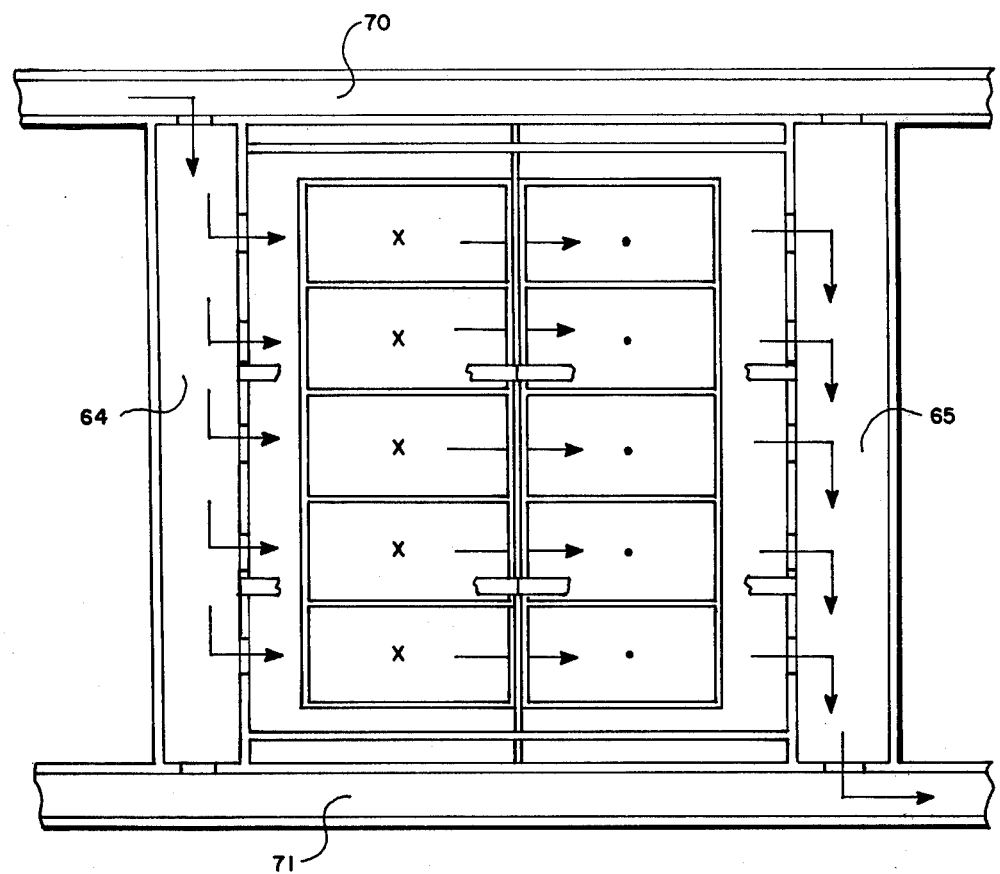
FIG. 7 is a plan view of the trench of FIG. 6.
Figure 8:
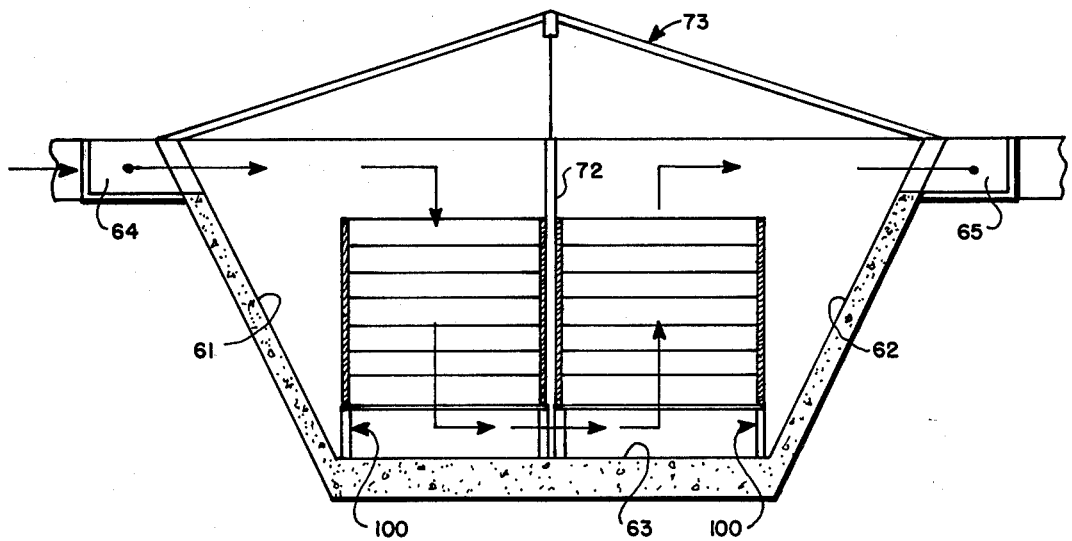
FIG. 8 is a cross-sectional elevation view of the trench of FIG. 7.

Referring to FIG. 6, 7 and 8, there is provided a single-septum seafood production trench 60. In production trench 60 there is provided a pair of sloping side walls 61 and 62. Side walls 61 and 62 slope upwardly and outwardly from a horizontally extending bottom 63. As will be apparent, the side walls 61 and 62 are sloping to facilitate the insertion and removal of inserts in and from the trench. Extending along the lateral edges of the trench 60 there is provided a pair of gutters 64 and 65. Gutter 64 is provided at each end with a pair of fluid passageways 66 and 67. Gutter 65 is provided with a similar pair of oppositely positioned fluid passageways 68 and 69. Each of the passageways 66, 67, 68 and 69 is provided to be removably fitted with a weir board for controlling the flow of water therethrough from and into a pair of flumes 70 and 71 located, respectively, at opposite ends of the trench 60. Located in the center and extending in a plane parallel to the major axis of trench 60 is a septum 72. Septum 72 is supported from a truss system 73. Truss system 73, which is identical to the truss 28 of FIG. 2, supports the septum 72 a predetermined distance, as of 5 inches, above the floor 63 of the trench 60 for allowing water to pass therebeneath, as will be described below.

Figure 9:
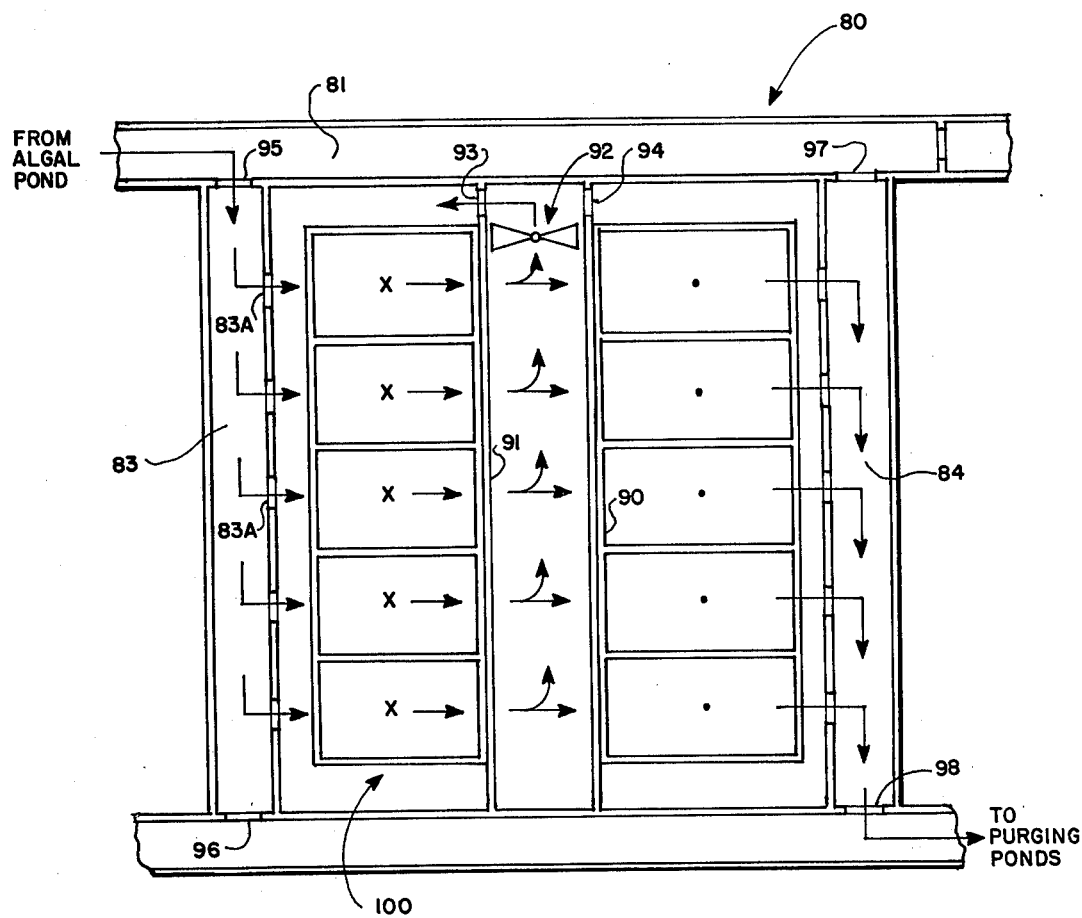
FIG. 9 is a plan view of an alternative production trench according to the present invention.
Figure 10:
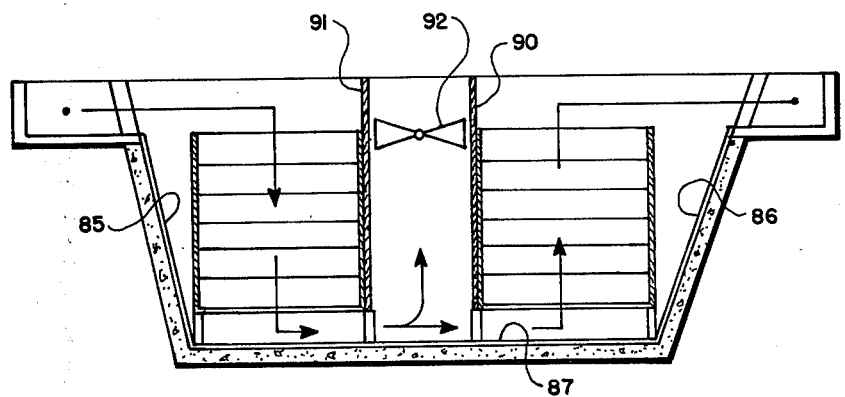
FIG. 10 is a cross-sectional elevation view of the trench of FIG. 9.

Referring to FIGS. 9 and 10, there is provided, in an alternative embodiment of a trench according to the present invention, a dual-septum trench 80. Trench 80 is provided at opposite ends with a pair of flumes 81 and 82. Extending along the lateral edges of trench 80 is a pair of gutters 83 and 84. Sloping downwardly and inwardly from gutters 83 and 84 there is provided, respectively, a pair of sloping walls 85 and 86. Walls 85 and 86 extend upwardly and outwardly from a bottom member 87. The walls 85 and 86 and bottom member 87 are lined with a nylon-reinforced butyl rubber liner of a quality suitable for containing potable water. Located in the center of the trench 80 and extending in a plane parallel to the major axis thereof is a pair of septum members 90 and 91. Members 90 and 91 are supported above the bottom member 87 a predetermined distance, as of 5 inches, for permitting water to flow therebeneath in a manner and by a means (not shown) substantially equivalent to the truss system of FIGS. 2 and 6–8. In practice, the members 90 and 91 are spaced approximately two feet apart and at one end thereof there is provided a recirculating impeller assembly 92 and a pair of weir outlets 93 and 94. At opposite ends of the gutter 83 and in communication with the flumes 81 and 82, there is provided a weir fluid passageway 95 and 96. Similarly, at opposite ends of the gutter 84, for providing fluid communication with the flumes 81 and 82, there is provided a pair of weir fluid passageways 97 and 98.

Referring to FIG. 11, there is provided for supporting the inserts to be described in the trenches 60 and 80 an insert-supporting pallet assembly 100. Pallet assembly 100 comprises a plurality of open-ended, adjacent box-like structures 101, 102, 103 and 104. Each of the structures 101-104 comprises a plurality of permanent wall members 105 and a removable wall member 106.

Referring to FIG. 12, there is provided a tray insert 110. Insert 110 has four side-wall members 111, 112, 113 and 114, and a bottom member 115. The side-wall members 111–114 are closed and the bottom member 115 is provided with a plurality of holes 116 for allowing the passage of water therethrough. The size of each of the box members 101, 102, etc. of assembly 100 and the size of the insert 110 of FIG. 12 are substantially identical such that the insert 110 rests on top of the side-wall members 105.

Referring to FIG. 13, there is provided, in an alternative insert for use in the trenches 60 and 80 of the present invention, a honeycomb insert 120. Insert 120 is provided with a plurality of closed cavities 121 and is inserted in the bottom of either of the trenches 60 or 80, as will be described.

Referring again to FIG. 1, in practice, as briefly discussed previously, in an actual embodiment of the present invention, the source of water 1 and source of phytoplankton 2 are wells which are located adjacent to an ocean. The source 2 is simply a relatively shallow ditch, as of 5 to 6 feet deep, which extends down into the earth to a depth sufficient to expose the natural water level in the earth. Water filters through the earth between the ocean and the well and is collected in the well. At the same time it carries with it phytoplankton. Usually, the well is left uncovered. As a consequence, phytoplankton and other marine micro-organisms are also carried to the well by the winds. This feature of the well undoubtedly allows for a plurality of species of micro-organisms to exist in the well simultaneously.

In the well, as in an ocean or bay having a relatively rich mixture of phytoplankton and water, the naturally occurring density of the phytoplankton is found to be between $10^1$ and $10^3$ organisms/liter. This density is generally much too low for growing seafood in commercially significant quantities rapidly. Accordingly, steps are taken to raise the density levels and one of the steps taken is to control the temperature of the water by providing properly sized algal reservoirs. This step is taken because it has been found that if the ambient temperature of the water in the reservoirs is maintained between 20°–26° C., the phytoplankton, if also properly fed, will grow by division and raise its density levels in a reproduction cycle having a period of approximately 16 hours.

To determine the density of the phytoplankton in the reservoirs 2 and 4, the density may be approximated visually. For example, it may be done by an operator who places his or her arm in the algal reservoir. If the reservoir contains phytoplankton at a density of approximately $10^7$ organisms/liter, the operator, depending on the ambient light, typically will be unable to see his fingers when the arm is placed into the water to a depth of the biceps. When the density of the phytoplankton reaches a level of $10^8$ organisms/liter, the operator, again depending on the level of the ambient light, will no longer see the ends of his fingers when the level of water reaches his wrist. Frequently, however, more scientific measures of density are also employed using conventional methods.

To insure that the phytoplankton is properly fed, fertilizer is added daily to each 2½ foot acres of water in the following quantities:
  sodium nitrate: 22.78 lbs.
  ammo-phosphate: 2.05 lbs.
  calcium silicate: 34.18 lbs.
  mineral mix: 4.56 lbs.
  chicken manure: 23.84 lbs.

For ease of distribution, the sodium nitrate, ammo-phosphate, calcium silicate and mineral mix are mixed with the chicken manure in water to form a solution. The solid materials, typically in pellet and powder form, are mixed in the water by means of a conventional grain auger or the like, the auger serving to meter the solid components in measured quantities at a predetermined rate. The solution is then added to the reservoir as by means of the inlet 41 of FIG. 3, or in any other suitable manner. Thereafter, the water in the reservoir is circulated continuously by means of the apparatus 43.

Each of the above fertilizer components is commercially available from the places indicated and comprise the percentages of components as follows:

| Mineral Mix | |
|---|---|
| Iron sulphate | 5.38% |
| Manganese | 5.16% |
| Magnesium | 5.38% |
| Zinc | 5.12% |
| Copper | 5.36% |
| Boron | .54% |
| Molybdenum | .46% |
| Ammo-phosphate | |
| Nitrogen | 18% |
| Phosphorous-205 | 46% |
| Chilean Nitrate of Soda | |
| Nitrogen | 16% |
| from Brewer Chemical, Honolulu, Hawaii | |
| Chicken Manure - Super Gro | |
| Organic Nitrogen | 3.00% |
| Available Phosphoric Acid | 3.00% |
| Water Soluble potash | 2.50% |
| Calcium (elemental) | 5.00% |
| Magnesium (elemental) | .75% |
| Iron (elemental) | .25% |
| Organic Matter | 50.00% |
| from Olson Bros., North Hollywood, California | |

It is to be understood that, while a specific group of fertilizer components has been described for increasing the density of the phytoplankton to acceptable levels, one or more of the components may be omitted or the indicated quantity of the component changed to suit changes in various systems conditions, and possibly increase the rate of phytoplankton growth. For example, the listed dehydrated chicken manure may be replaced by other types of organic components including other types of manure.

As previously indicated, one of the principal features of the present invention is the fact that all of the reservoirs and source 1 are exposed to the atmosphere. This is believed to result in an accumulation of a plurality of species of phytoplankton in the reservoir and phytoplankton source. This, in turn, is believed to have a significant effect on the stability of the phytoplankton growth in that it serves to maintain a "bloom" at the high density levels indicated over long periods of time and preferably continuously without a "crash." A "bloom" is defined as a high density suspension of phytoplankton in a body of water. A "crash" is defined as a sudden and unexpected termination of a bloom, evidenced by the death of the phytoplankton and the accumulation of the cells on the bottom of the reservoirs. In an actual test, it has been found that, using the steps herein described and the fertilizer named in the amounts listed, a bloom has been maintained in an acre of water 2½ feet deep continuously over a period exceeding 60 days at an average temperature of about 24° C.

Once a satisfactory bloom is obtained in an algal reservoir, the water is pumped from the reservoir through one or more of the production trenches described. The pump for pumping the water from the reservoirs is preferably placed at its input, as shown in FIG. 2. Also, any of the trenches described herein may be coupled to the reservoir singly or collectively by means of interconnecting flumes such as the flumes 22 and 23 of FIG. 2, the flume 70 of FIG. 6 or the flume 81 of FIG. 9. As shown in FIG. 5, in a large system using the four reservoirs 50, 51, 52 and 53, the water is transported from the water source through the flume 59A and distributed to each of the reservoirs 50-53 in approximately equal amounts by means of the weir box 54 and removed from the reservoirs 50-53 via the flume 59. Flow into and from the reservoirs 50-53 is controlled by means of boards removably placed in the weirs 55, 56, 57 and 58 and the weirs 59B. The weirs 55-58 and 59B, like all the weirs used in the system, simply use boards which are inserted and removed from adjoining slots provided for them. In practice, the number and size of the reservoirs that are coupled to the production trenches depend on the number and size of the trenches and vary accordingly. Typically, however, the reservoirs each range in size from ¼ acre to one acre and are 2½ feet deep. The rate at which the water is pumped from the algal reservoir is such that approximately one-half to two-thirds of the water is exchanged continuously within every 24-hour period.

To grow oysters in any of the trenches described, one or more of the pallet assemblies 100, comprising the box portions 101-104, is placed in the trench with the removable side-wall members 106 of the box portions 101-104 facing the trench septum. If the trench 60 of FIG. 2 is used, the members 106 face the septum 72. If the trench 80 of FIG. 9 is used, the members 106 face either septum 90 or 91, depending on the location of the pallet in the trench. As will be apparent, each of the members 106 is used to block the flow of water beneath the septum immediately adjacent thereto or to permit the passage of water therebeneath when removed. In practice, a member 106 is removed when its associated box portion is supporting a tray 110 and is put in place when no tray is supported so as to divert the flow of water in the trench through the trays in the other parts of the trench. After placement of the pallets in the trench, each of the trays 112, which are approximately 2 feet × 2 feet × 2½ inches, is filled with about 15,000 seed oysters and approximately 6 of the trays 112 are stacked in vertical relationship on each of the box portions 101-104.

Referring to trench 60 of FIG. 6, after the trench 60 has been loaded as described above, water is caused to flow from the algal reservoirs through the flume 70 and gutter 64 into the center of the trench through a plurality of weirs 64A. From the weirs 64A, the water is directed vertically downwardly through the stacks of trays on the left side of the septum 72, under the septum 72 through the portion of the pallet 100 from which the side-wall member 106 is removed and upwardly vertically through the stack of trays 110 stacked on the right side of the septum. Water emerging from the trays stacked on the right side of the septum is collected in the gutter 64 from a plurality of weirs 65A and discharged via the flume 71 to a purging pond, such as the pond 30 of FIG. 2.

After a predetermined period of time, the weirs 66 and 69 are closed and the weirs 68 and 67 are opened. This causes the water from the reservoirs to flow in a reverse direction from the gutter 65 downwardly through the trays on the right side of the septum 72, beneath the septum 72 and upwardly through the trays on the left side of the septum for discharge via the gutter 64 and the flume 71. By reversing the flow of water and plankton through the trench 60 every 24 hours, there is provided a more uniform distribution of nutrients to the oysters in the trays and a more efficient use of the phytoplankton from the reservoirs.

As the oysters grow, and their volume increases, they must be thinned — i.e., their number in each tray reduced. To thin the oysters in each of the trays, the trays are removed from the trench at periodic intervals. At the present time, it is found that it is possible to perform the thinning operation once every 30 days. For example, during the first thinning, the 15,000 seed oysters in a tray are thinned to approximately 7,500, then 3000, then 1000 oysters per tray. Thereafter, the 1000 oysters are thinned to 500 oysters per tray, from 500 oysters per tray to 250 oysters per tray and finally to approximately 100 oysters per tray. From the foregoing thinning schedule, it can be determined that the approximate growing cycle for the oysters, using the methods of the present invention, is approximately 6 to 7 months.

Referring to FIGS. 9 and 10, the trench 80 is used in substantially the same manner as the trench 60 of FIGS. 6–8. Water from an algal reservoir is received in the flume 81 and directed through the trench 80 via the gutter 83 and a plurality of weirs 83A. From the weirs 83A the water is caused to descend vertically through the trays and underneath the septum 91. Part of the water passing beneath the septum 91 continues across the bottom of the trench 80, passes beneath the septum 90 and rises vertically through the trays on the right side of the septum 90. The remaining portion of the water flows vertically upwardly between the septums 91 and 90 and is drawn by the impeller assembly 92 and forced through a weir 93 so as to form an internal recirculation path. The recirculation of the water in the trench 80 is intended to improve the growth rate of the oysters growing therein. To reverse and redirect the flow of water in the trench 80, as in the trench 60, the weirs 93, 95 and 98 are closed and the weirs 92, 96 and 97 are opened.

After the water leaves either the trench 60 or the trench 80, it is directed to a 3-foot purging pond coning seaweed such as purging pond 30 of FIG. 2. At a suitable location in the purging pond, there is provided a well for discharging the effluent therefrom. The well is located at a position sufficiently removed from the water source so as not to contaminate the water source. Alternatively, the pond may be controllably discharged directly into the production trenches. The control is necessary for preventing the spread of contaminants should they occur.

The type of seaweed contained in the purging pond may vary but a suitable type is benthic algae and the like which grows very fast with the effluent from oysters.

In addition to oysters, other types of seafood can also be grown in the trenches 60 and 80, such as turtles, lobster, octopuses, fish, etc. Clams are grown in the same manner as oysters; however, lobster and octopuses, which are also grown, require different treatment.

Referring to FIG. 13, when growing lobster or octopuses, the insert 120 is used. The insert 120, which comprises a plurality of open-ended enclosures which serve as hiding places for the creatures, is necessary because of the aggressive nature of the creatures. In use, it is inserted in the trench and the water from the reservoirs is caused to flow through the enclosures.

A preferred embodiment and a number of alternative embodiments of the present method and apparatus are described. It is recognized and contemplated, however, that other embodiments will undoubtedly occur to those skilled in the art and that many changes may be made to the embodiments described without departing from the spirit or scope of the present invention. For example, if the system of the invention is used in an area wherein the density of phytoplankton in the natural water transported to the algal reservoir is below a predetermined density as of $10^3$ organisms/liter, it is necessary to add phytoplankton to the water to insure adequate and rapid blooms. Similarly, the rate of flow of food and water and its temperature in the trenches is adjustable to control the growth rate and spawning of the seafood which tends to reduce its bulk. Also, the continuous inoculation of a reservoir, once in bloom, may be beneficial to its stability, though this is not considered critical. For example, it is believed that the optimum feeding density for feeding oysters is about $10^8$ cells/liter. Thus, if the density in a reservoir exceeds that level, water from the source 1 may be selectively mixed with the water from the reservoirs 3 as shown by the dashed line 1C so as to maintain the optimum feeding density. Finally, various other changes may also be made to the apparatus. For example, the septum may be simply a sheet of wood, plastic or metal supported in a number of other suitable ways other than by a truss. Similarly, the gutters 64 and 65 of FIG. 6 and the gutters 83 and 84 of FIG. 9 may be omitted and the water permitted to initially flow from the end of the trenches between the trays and the side walls until the trench is filled, before passing through the trays. Also, instead of butyl rubber, the trenches may be lined with concrete.

For these reasons, it is intended that the scope of the present invention be not limited to the embodiments described but, rather, be determined by reference to the claims and their equivalents hereinafter provided.

What is claimed is:

1. A method of growing seafood in commercial quantities comprising the steps of:
   providing a source of a plurality of species of phytoplankton;
   providing a source of brackish or salt water;
   providing an algal reservoir;
   transporting water from the source of brackish or salt water to the algal reservoir;
   inoculating the water in the algal reservoir with a plurality of species of phytoplankton from the source of phytoplankton;
   adding organic animal manure and inorganic fertilizer to the water in the algal reservoir periodically for providing a mixture which is a nutrient for the plurality of species of phytoplankton used to inoculate the water, and subjecting the mixture to sunlight for increasing the density of each of the plurality of species of phytoplankton in the water;
   providing a production trench separate and apart from the algal reservior for containing seafood for which the phytoplankton in the algal reservoir is a nutrient;
   placing seafood in the trench; and
   continuously transporting a predetermined percentage of the water and phytoplankton from the algal reservoir through the trench containing the seafood for growing the seafood.

2. A method according to claim 1 wherein wastes and effluent from the seafood growing in the trench is deposited in the water; and further comprising the steps of transporting the water, including the effluent and wastes deposited therein, from the trench to a purging pond containing seaweed for which the wastes and effluent are a nutrient for growing the seaweed and purging the water of the nutrient.

3. A method according to claim 1 wherein said step of providing an algal reservoir comprises providing an algal reservoir having a depth of about 2½ feet and a surface area equal to or exceeding ¼ acre and said step of transporting water continuously to and from said algal reservoir comprises the step of continuously transporting approximately one-half to two-thirds of the volume of the water to and from the algal reservoir in each successive 24-hour period.

4. A method according to claim 3 wherein said step of transporting water and phytoplankton from the algal reservoir through a trench containing seafood comprises the step of transporting water and phytoplankton through the trench at a rate which is equal to or exceeds the feeding capacity of the seafood.

5. A method according to claim 4 wherein said step of adding organic and inorganic fertilizer to the water comprises the step of adding a predetermined amount of sodium nitrate, ammo-phosphate, calcium silicate, mineral mix and organic manure to the water.

6. A method according to claim 5 wherein said predetermined amount comprises approximately 22.78 pounds of sodium nitrate, 2.05 pounds of ammo-phosphate, 34.18 pounds of calcium silicate, 4.56 pounds of mineral mix and 23.84 pounds of organic manure to each 815,000 gallons of the water.

7. A method according to claim 1 comprising the step of periodically adding to the water in the algal reservoir, in addition to the organic animal manure, inorganic fertilizer including an amount of nitrogen, phosphorous, silicon, and trace elements.

8. A method of growing seafood comprising the steps of:
providing a source of a plurality of species of phytoplankton;
providing a source of brackish or salt water;
providing an algal reservoir;
transporting water from the source of brackish or salt water to the algal reservoir;
inoculating the water in the algal reservoir with a plurality of species of phytoplankton from the source of phytoplankton;
adding fertilizer to the water in the algal reservoir periodically for providing a mixture which is a nutrient for the pluarality of species of phytoplankton used to inoculate the water, and subjecting the mixture to sunlight for increasing the density of each of the plurality of species of phytoplankton in the water;
providing a production trench separate and apart from the algal reservoir for containing seafood for which the phytoplankton in the algal reservoir is a nutrient;
placing a predetermined number of seafood animals in each of a plurality of trays;
stacking a selected number of the plurality of trays in each of a plurality of vertical stacks in the trench; and
causing the mixture of water and phytoplankton flowing from the algal reservoir to flow vertically through each of the stacks for distributing the phytoplankton to the animals.

9. A method according to claim 8 wherein said step of causing a mixture of water and phytoplankton to flow vertically through each of the stacks further comprises the steps of causing the mixture of water and phytoplankton to flow vertically through each of the stacks in one direction for a predetermined period of time, and in an opposite direction for an approximately equal period of time for providing a uniform distribution of the phytoplankton to the seafood juveniles.

10. In a system for growing seafood in commercial quantities, the improvement comprising:
reservoir means for growing nutrients in water for feeding seafood;
means forming an elongated production trench for removably receiving a plurality of trays, each of said trays being adapted for containing a particular type of seafood and each being built for causing water flowing through the trays to flow vertically therethrough;
means for transporting water and nutrients from the reservoir means to the trench;
means for discharging water from the trench;
a septum disposed in the trench for directing water in the trench through the trays and a box-like framework for supporting in vertical relationship a plurality of the trays above the bottom of the trench, said box-like framework comprising three permanent side members and one removable side member which is located facing the septum and removable from the framework for allowing water to pass vertically through the trays supported on the framework and under the septum and which is insertable in the framework for blocking the flow of water therethrough and preventing its passage under the septum.

11. A land-based aquaculture system for growing seafood on land in commercially significant quantities comprising:
means forming a reservoir for growing seafood nutrients suitable for feeding seafood;
a trench;
means forming a plurality of trays for containing seafood adapted for removable insertion in the trench, each of the trays having four closed sidewall members and an apertured bottom member for preventing a horizontal flow of water therethrough, while allowing a vertical flow of water therethrough;
means for transporting the seafood nutrients from the reservoir means to the trench;
a septum supported in a plane parallel to the major axis of the trench, said septum being supported a predetermined distance above the bottom of the trench for causing the seafood nutrients from the reservoir to flow beneath the septum and through the trays along a vertical downward and upward path in the trench;
means forming a purging pond for containing seaweed for which the wastes from seafood growing in the trench are nutrients; and means for transporting the effluent from the trench to the purging pond means for purging the effluent of the seaweed nutrients.

12. A system according to claim 11 wherein said means for causing the nutrients to flow beneath the septum further comprises a box-like framework having a plurality of box-like sections, each of said sections being adapted to support a plurality of said trays and having a removable wall section located in a position facing the septum, said removable wall section being removable for allowing water passing through trays supported on the section to pass beneath the septum adjacent to the section and replaceable for blocking the flow of water adjacent to the section, as when no trays are being supported thereon.

* * * * *